(12) United States Patent
Fluhler

(10) Patent No.: US 11,545,038 B1
(45) Date of Patent: Jan. 3, 2023

(54) SYSTEMS AND METHODS FOR OVER THE HORIZON SENSING OF LOW SMALL TARGETS

(71) Applicant: Herbert U. Fluhler, Madison, AL (US)

(72) Inventor: Herbert U. Fluhler, Madison, AL (US)

(*) Notice: Subject to any disclaimer, the term of this patent is extended or adjusted under 35 U.S.C. 154(b) by 597 days.

(21) Appl. No.: 16/597,736

(22) Filed: Oct. 9, 2019

Related U.S. Application Data

(60) Provisional application No. 62/743,202, filed on Oct. 9, 2018.

(51) Int. Cl.
| | |
|---|---|
| G05D 1/00 | (2006.01) |
| G08G 5/00 | (2006.01) |
| G01S 13/00 | (2006.01) |
| B64C 39/02 | (2006.01) |
| B64F 3/00 | (2006.01) |

(52) U.S. Cl.
CPC ......... G08G 5/0069 (2013.01); B64C 39/022 (2013.01); B64C 39/024 (2013.01); B64F 3/00 (2013.01); G01S 13/003 (2013.01); G08G 5/0052 (2013.01)

(58) Field of Classification Search
CPC ........ B64C 2201/027; B64C 2201/108; B64C 2201/127; B64C 2201/141; B64C 2201/148; B64C 39/02; B64C 39/022; B64C 39/024; B64D 47/08; G01L 5/04; G05D 1/0684; G05D 1/0866; G05D 1/101; H04W 4/40

USPC ....................................................... 244/53 R
See application file for complete search history.

(56) References Cited

U.S. PATENT DOCUMENTS

| | | | |
|---|---|---|---|
| 11,235,890 B1* | 2/2022 | Dahlstrom | B64D 47/08 |
| 2009/0326735 A1* | 12/2009 | Wood | G05D 1/0088 701/2 |
| 2015/0041598 A1* | 2/2015 | Nugent | H04B 10/807 244/53 R |
| 2017/0268714 A1* | 9/2017 | Giron | F16L 55/48 |
| 2017/0347169 A1* | 11/2017 | Chun | H04Q 9/00 |
| 2018/0341014 A1* | 11/2018 | Pesik | G01S 13/882 |
| 2019/0063881 A1* | 2/2019 | Abramov | B64C 39/024 |
| 2019/0088156 A1* | 3/2019 | Choi | G05D 1/0038 |
| 2020/0200850 A1* | 6/2020 | Piazza | B64D 47/00 |
| 2020/0218288 A1* | 7/2020 | Johnson | G05D 1/0866 |
| 2020/0225684 A1* | 7/2020 | Anderson | B64C 39/022 |
| 2020/0385115 A1* | 12/2020 | Piasecki | H04B 10/2575 |
| 2021/0129982 A1* | 5/2021 | Collins | B64F 3/02 |

\* cited by examiner

*Primary Examiner* — Tan H Trinh
(74) *Attorney, Agent, or Firm* — Patent Grove LLC; Tomas Friend

(57) ABSTRACT

A system and a method are provided for achieving long range, over the horizon (OTH), persistent surveillance, alerting, tracking and situational awareness against small, low radar cross section moving targets. The system and method use one or more tethered unmanned arial systems, or unmanned arial vehicles, to lift components including a radar antenna to a height above nearby obstacles or much higher. The system and method can also be used for subsurface radar detection and tracking applications, as well as communications with submarines.

19 Claims, 10 Drawing Sheets

SYSTEMS AND METHODS FOR OVER THE HORIZON SENSING OF LOW SMALL TARGETS

CROSS-REFERENCE TO RELATED APPLICATIONS

This application claims priority to U.S. provisional application 62/743,202 filed Oct. 9, 2018 and which is incorporated by reference in its entirety for all purposes.

STATEMENT OF FEDERALLY SPONSORED RESEARCH OR DEVELOPMENT

The invention disclosed herein was made without government support.

BACKGROUND OF THE INVENTION

Field of the Invention

This application relates to the sensing of objects of interest, including targets on or in land, sea and air and located beyond the local, on-surface tangent plane of the earth.

Background and Related Art

Radio, radar, infrared, optical, hyperspectral and acoustic sensors are known in the art for their ability to detect, track and classify remote objects, or targets, at a distance. Objects of interest may include flying objects such as aircraft, missiles, rockets, artillery, mortars, bombs, balloons, blimps, gliders, helicopters and gyrocopters as well as dust, precipitation, and atmospheric ion densities. Objects of interest may include objects on the ground such as vehicles, buildings, roads, runways, forests, crops, and geologic features as well as the ground itself. Objects of interest may also include the objects on the sea such as ships, submarines, rafts, platforms, and boats as well as waves and the sea itself. All these and other potential objects of interest may be readily observed by any of the the aforementioned sensors if they are relatively nearby, as gauged by the competing radius of the earth or other body the sensor rests on, and if the sensor has Line Of Sight (LOS) to the object(s) of interest.

A recurring problem in remote sensing is the limitation of what is in the LOS, which is limited by the curvature of the earth and/or a body hosting the sensor. The curvature of the earth blocks the LOS between the sensor and the object of interest as the distance between them increases, eventually completely obscuring the object of interest from the sensor and thereby making it undetectable, untraceable and unclassifiable. The distance between the sensor and the object at which the object becomes obscured is usually around 20-40 kilometers for ground-based sensors.

Some methods have been devised to address this problem. One such method is Over The Horizon (OTH) Radar (OTHR), wherein the radar beam is directed to bounce off of ionic layers in the atmosphere. OTHR is a valuable remote sensing method for strategic early warning of attacks, but its useful range is limited to larger distances because of ionic layer reflection geometry, which is not useful for tactical situations requiring detection ranges of hundreds of kilometers.

Another such method for overcoming the LOS problem is to host a sensor on a blimp, dirigible, or ballon at a high altitude. Disadvantages of this approach include requirements for a ground station and crew to keep the sensor moored and powered and relative immobility that makes such an airborne platform easy to locate and destroy.

A need remains for systems and methods that provide long range but tactical OTH LOS sensing on the order of, for example, hundreds of kilometers.

BRIEF SUMMARY OF THE INVENTION

Embodiments of the present invention, singly or in any combination, mitigate, alleviate, and/or eliminate deficiencies, disadvantages, or issues in the art of remote sensing methods and systems by providing for methods and systems for tactical range OTH sensing. The present invention uses an Unmanned Aerial System (UAS, a.k.a Unmanned Aerial Vehicle or UAV) tethered to a suitable anchor and/or ground station to carry one or more sensors. The tether or ground station prevents UAS from drifting away and provides it with power, control and communications. The tether may serve as an antenna for long range RF communications and/or radar sensing.

In one aspect, the invention provides a persistent early warning OTH LOS detection and alerting sensor system against one or more encroaching objects, e.g. a cruise missile. In another aspect, the invention provides a system and method for tracking and classification of OTH LOS objects. In yet another aspect, the invention provides a system and method for searching, tracking and classifying objects of interest in a way to maintain tactical covertness and survivability. These and other aspects of the invention are explained in the following description of the invention.

BRIEF DESCRIPTION OF THE DRAWINGS

The elements of the drawings are not necessarily to scale relative to each other, with emphasis placed instead upon clearly illustrating the principles of the disclosure. Like reference numerals designate corresponding parts throughout the several views of the drawings in which.

DETAILED DESCRIPTION OF THE INVENTION

Figure 1:
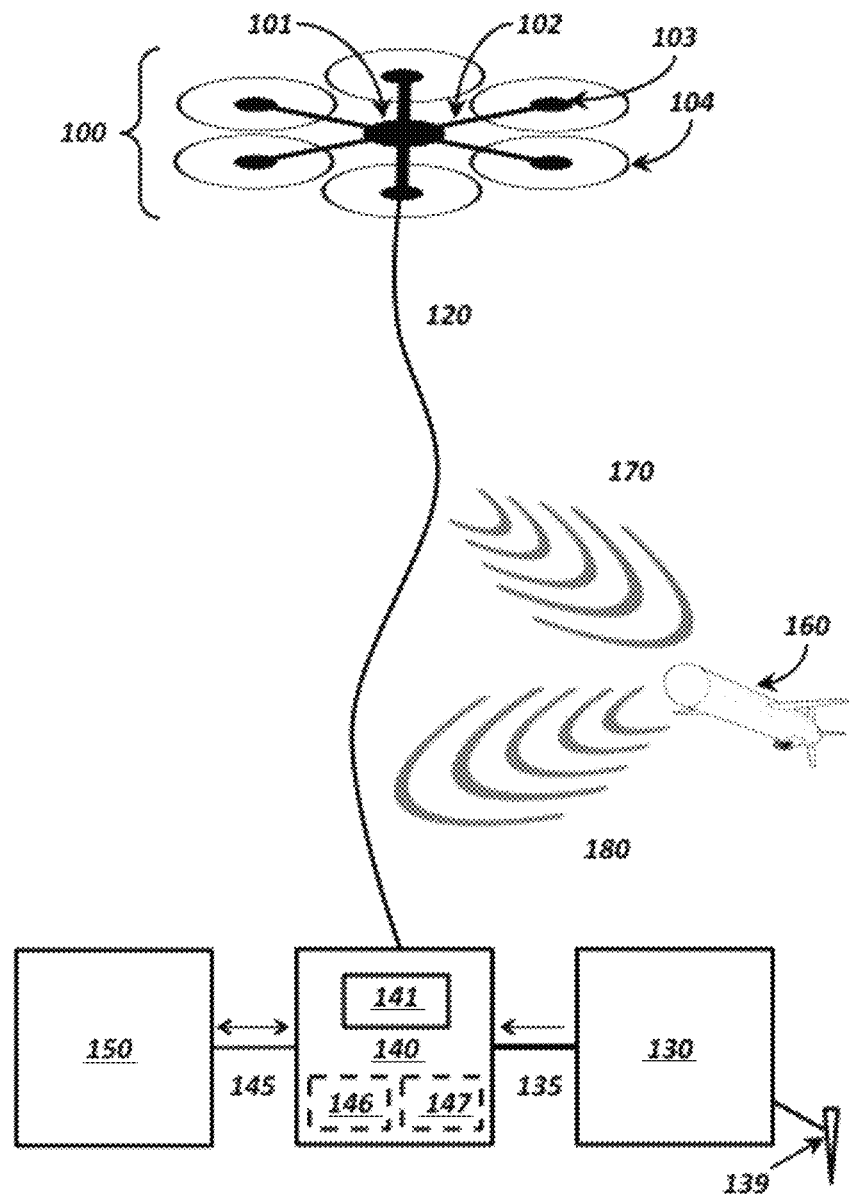
FIG. 1 is a schematic of an embodiment of the invention identifying major constituent subsystems, parts and operation.

Referring to FIG. 1, an embodiment of a system according to the invention may comprise a hovering type of Unmanned Aerial System (UAS) (100) comprising a central body (101) containing power conditioning and control sensors and circuits, one or more support structures (102) such as struts or arms, a drive motor or gearbox (103), and a propeller or rotor (104). If the the number of support structures, motors and propellors are all one, the drone may be considered a helicopter. In such case a tail rotor must usually be provided in order to counter the torque of the rotor, so either an additional identical or near identical counter rotating rotor is provided, or the drone more resembles conventional quad-, hex- or octo-copters common in today's drone industry.

The specific type of drone, or UAS, (100) need not be a hovering drone, as long as it can provide sufficient lift for extended periods of time for uninterrupted surveillance. At an altitude of about 10 meters, the UAS (100) provides clearance over local obstructions such as short buildings, local terrain masking, and some shorter trees. At an altitude of about 100 meters, the UAS (100) provides extended surveillance over higher local terrain masking, and also provides some extension of LOS beyond the earth limb on flatter terrain or over water. At an altitude of 1000 meters or more, the UAS (100) provides significant additional LOS beyond the earth limb corresponding to hundreds of kilometers of clear LOS range to potential targets of interest. The specific height chosen may therefor be determined on the specific target detection mission requirement for the sensor.

The UAS, in this case, drone (100) supports and suspends a trailing tether (120) from the UAS (100) to an anchoring base station (140). The tether (120) preferably comprises high tensile strength cable such as Kevlar or Spectra type materials to maximize strength to weight ratio. Tether (120) additionally comprises at least one strand of conducting cable that provides power that is produced in a power source (130) e.g. a power generator, and grounded using grounding stake and cable (130), through a power cable (135) to the base station (140) and thence to the UAS (100) over the conducting cable within tether (120). The conducting cable of tether (120) preferably also acts as an antenna for an RF signal that is propagated up to and down from the conductive tether. Additionally, conducting tether (120) may provide a conductive data communications channel between the base station (140) and control electronics in the UAS body (101) In an alternative embodiment, separate conductive cables may be integrated into tether (120), one as an antenna, one for power, and one for communications. For data communications, the tether (120) may additionally or alternatively comprise a fiberoptic cable.

The power cable within tether (120) may be implemented as a power cable comprising two or three insulated conductive lines and carry 3-phase Alternating Current (AC) as a cable comprising two lines driven differentially, with either AC or Direct Current (DC), or driven in a common mode configuration with one hot line and one ground or return line, either with AC or DC. In yet another embodiment, a singular power line may terminate in an atmospheric discharge from the UAS (100) into the atmosphere. Power conversion circuits within the UAS body (101) convert higher voltage from the lines for use by the motor(s) and on board electrical systems.

The base station (140) comprises a tether control mechanism (141) comprising a tether reel and spool which, in conjunction with controls within the UAS body (101), measure tether tension, provide data and commands over the tether (120) and keep the tether (120) at a desired tension, and/or the UAS (100) at a desired height. The UAS (100) may comprise a GPS receiver to track UAS position. The UAS (100) may comprise an internal inertial measurement unit (IMU) which, combined with data from the GPS and UAS controls, assists with station keeping in both altitude and lateral displacement. The IMU, and optionally also air speed indicators in the UAS (100), may allow the drone to dynamically "fly" into the wind, and counter wind drag on the tether, thereby keeping the tether substantially stationary and preventing excessive tension on the tether (120).

An RF transmitter and RF receiver together form a radar transceiver (146) shown within the base station (140) in FIG. 1, although the radar transceiver (146) may be physically separate from the base station and operationally connected base station. The radar transceiver (146) is electronically connected either conductively or inductively to, and uses the conductive cable within tether (120), for a monopole antenna to transmit an RF waveform (170) and, due to the vertical length of tether (120) above the ground, provides advantageous OTH LOS visibility to targets compared to ground posted transmitters. A target (160) within the OTH LOS will reflect some of the transmitted waveform (170) back towards tether (120), thereby creating a reflected waveform (180) that is intercepted by the same conducive cable within tether (120) used to transmit the outgoing waveform and/or by a separate receiving conductive cable. The received, reflected waveform is routed to the base station (140) where it may be filtered. If the power of the reflected waveform (180) is electrically detectable with the available Effective Radiated Power (ERP) provided by the transceiver—antenna combination, a detection of the target (160) is registered nominally in range and doppler within a radar Signal Processor (147) that may be located in the base station (140) or separate from, but functionally coupled to the base station.

Once targets are detected and under track, and ideally also classified, the tracks are transmitted to a Mission Control (MC) Command and Control (C2) system (150) over an established C2 network (145), and control commands are bidirectionally communicated over the network between the MC and C2 system (150), the base station (140) and the control system in the UAS body (101). In this way the system provides OTH LOS detection and tracking of targets of interest, providing at least a "Bell Ringer" alert mode of prospective incursion of low altitude targets. These data can provide confirmation of OTH targets detected by one or more of few other sensors. Confirmation of targets is almost always called for in military operations in order to ensure a proper and appropriate reaction to a threat, and minimization of fratricide.

The above Bell Ringer function of a system as shown FIG. 1 provides the OTH LOS range to the target, the radial speed of the target and the number of targets, all of which are important pieces of information, particularly if no other sensors have been able to detect the targets due to their OTH nature. With these data, other, additional sensors can be cued to look for the inbound or outbound targets by lowering their detection thresholds for the likely range of the target with respect to each additional sensor and the likely speed of the target with respect to each additional sensor, thereby ensuring those additional sensors acquire the target at the earliest time and farthest range to provide the longest possible reaction time.

One such additional sensor may be an adjunct sensor, such as a FLIR (Forward Looking Infrared) or IRST (Infrared Search and Track) sensor either built into, mounted to, or suspended from the body (101) of the UAS, or in-line with the the the tether (120). By use of this or other light weight sensors proximate to the maximum altitude provided by the UAS (100) and tether (120) combination, and by correlation of detection times and signal rate change increase (i.e., the $1/R^2$ dependence), and the application of suitable algorithms such as Multi-Hypothesis Tracker (MHT) and Angle Only (AO) Kalman Filters, such sensors can, in combination with the present system, provide angular information to candidate detected targets.

Figure 2A:
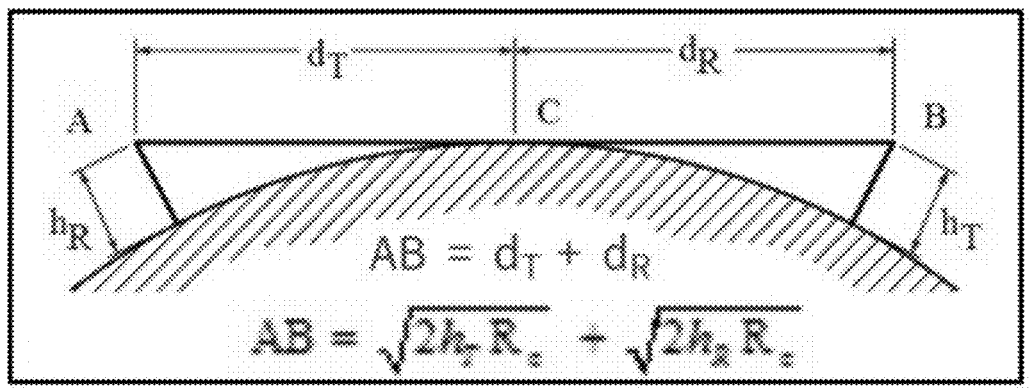
FIG. 2A is a pictorial of Other The Horizon (OTH) sensing geometry.
Figure 2B:
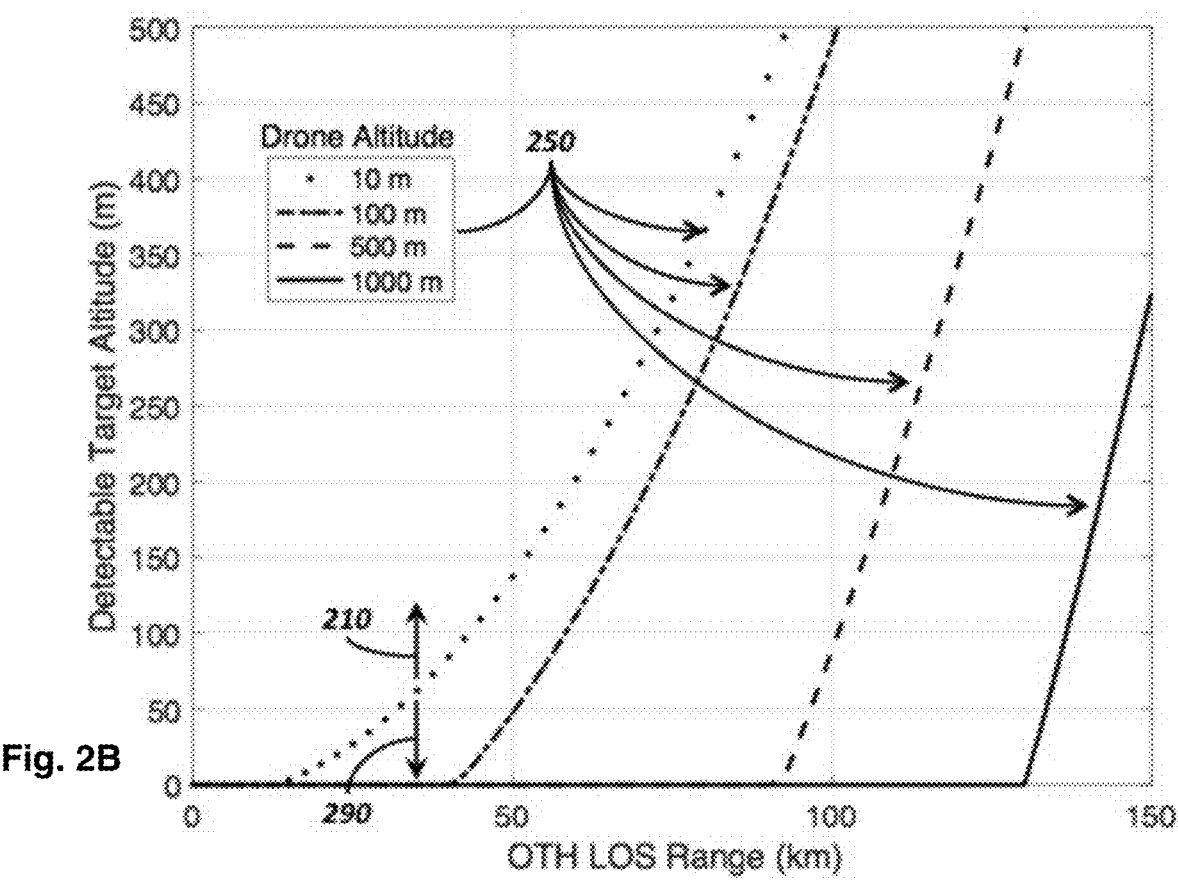
FIG. 2B is a plot of detectable target altitudes vs. range for radar sensors at different altitudes.

FIGS. 2A and 2B show the Earth Horizon Limb geometry and a plot of the target altitude for different drone heights (250) versus expected OTH LOS radar detection range using a 4/3 Earth Radius refractive model for the disclosed radar sensor, wherein hr=Radar Height, ht=Target Height, Re=Earth Radius, and the range between the radar and the target R=AB. Target altitudes above each curve (210) are LOS visible over the horizon, and target altitudes below each curve (290) are not LOS visible because of the earth horizon and insufficient radar refraction to be observed. The plot illustrates that detection range of very low altitude targets can be greatly extended with even moderate increases in sensor altitude.

Figure 3:
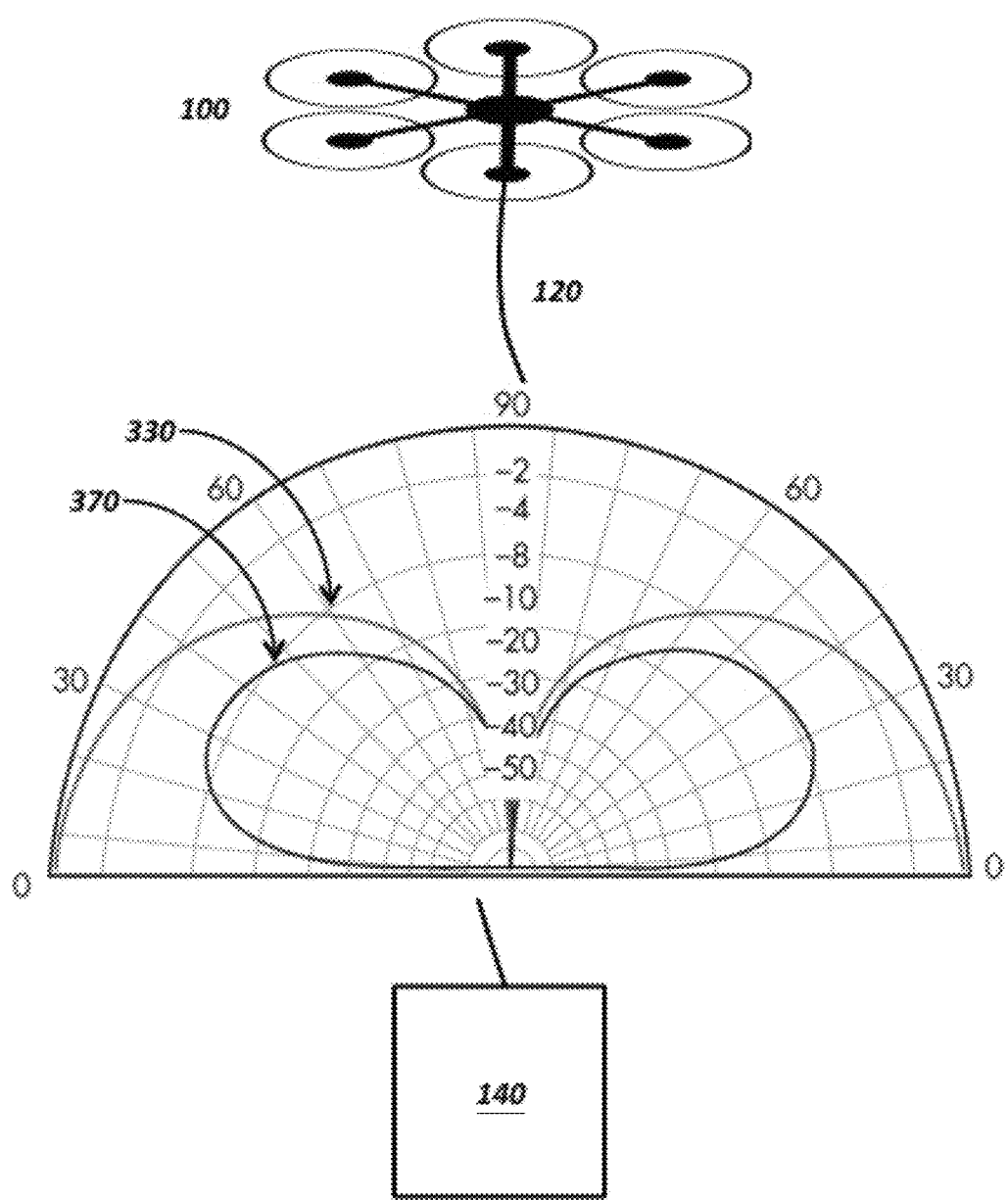
FIG. 3 is an illustration of antenna patterns achieved by monopole or dipole antennas that integrate into a tether anchoring a lifting drone.

There are a number of ways in which the conductive line(s) within the tether (120) may be employed as a radar antenna. The simplest and lowest modality is to employ the conductive line(s) within the tether (120) as a monopole antenna, a dipole antenna, and both, depending on where the RF energy is applied. Such an antenna may be a Ground Plane Monopole, or a Marconi antenna, wherein base station (140) also deploys a suitable ground plane, or is well connected to the ground to employ earth as a ground plane. By applying the RF energy at or near the base station (140), the resulting antenna pattern resembles curve (330) in FIG. 3. If the the feed point is raised up higher along the tether (120), the resulting antenna pattern resembles the dipole curve (370) in FIG. 3. Therefore, a trade may be performed to place the feed point at a height that provides the highest OTH LOS gain for the lowest net weight once additional weight for feed cable is considered.

If the antenna extends up the totality of the tether (120), then the corresponding wavelength for either the monopole or dipole mode of the resulting tether based antenna will be large. If the tether (120) is, for example, 1000 meters high, then for the monopole mode, the resonant wavelength is four times the height of 1000 meters, or 4000 meters wavelength, which corresponds to a frequency of 75 kHz, and for the dipole mode it is two times the height, or 2000 meters, corresponding to 150 kHz frequency. Both of these frequencies are below the nominal 1.5-3 MHz cutoff for Ground Wave propagation, and fall within the long wave frequency (LF) band (International Telecommunications Union's (ITU's) LF band is between 30 kHz and 300 kHz) used for long range ground wave radio operation over 100 km up to circa 2000 km range. Ground wave propagation exploits refraction both around terrain masking as well as over the curvature of the Earth, thereby enabling OTH sensing of low altitude targets, even if geometric LOS visibility is not available. This is important for providing the objective "Bell Ringer" and similar early warning notification of inbound low altitude targets of interest.

Even lower frequencies, e.g. 30 kHz or lower, can be supported by longer tether antennas (e.g. 2,500 meters), which enable other applications such as terrain and marine subsurface radar sensing from above. For example, very low frequency (VLF) waves below 30 kHz can be used to communicate at transcontinental distances and can penetrate saltwater to depths of hundreds of feet.

Using LF band frequencies with a Ground Wave attribute for OTH sensing allows the use of Doppler Shift (a.k.a. Doppler Frequency) to separate a moving target return from stationary ground clutter. The Doppler shift of a radially ingressing 300 meters per second (m/s) target at 75 kHz is given by the Doppler Shift formula:

$$Fdop=2*Vel*Frf/c,$$

where Fdop is the desired Doppler Frequency Shift, Vel is the radial velocity of the target, Frf is the RF carrier frequency, and c is speed of light. For a LF band frequency of 75 kHz, the Doppler Frequency is about 0.15 Hz. If this were the lowest doppler frequency to be detected, it would correspond approximately to the Doppler Filter width, which in turn is inversely related to the dwell time. Therefore, if the radar dwells with a Moving Target Indication (MTI) or Pulse Doppler waveform for 1/0.15=6.66 seconds, it could resolve the Doppler Shift. Because the wavelength is so long, the station keeping accuracy of known UASs is adequate for performing long period coherent integration. For radar having a bandwidth of 75 kHz from a low frequency of 75 kHz to 150 kHz, the associated range resolution is 2000 meters. This is a somewhat larger range bin than many conventional surveillance radars with range bins between 100-300 m, but the ground wave's propagation at shallow, near tangent incidence angle makes clutter return small.

Figure 4:
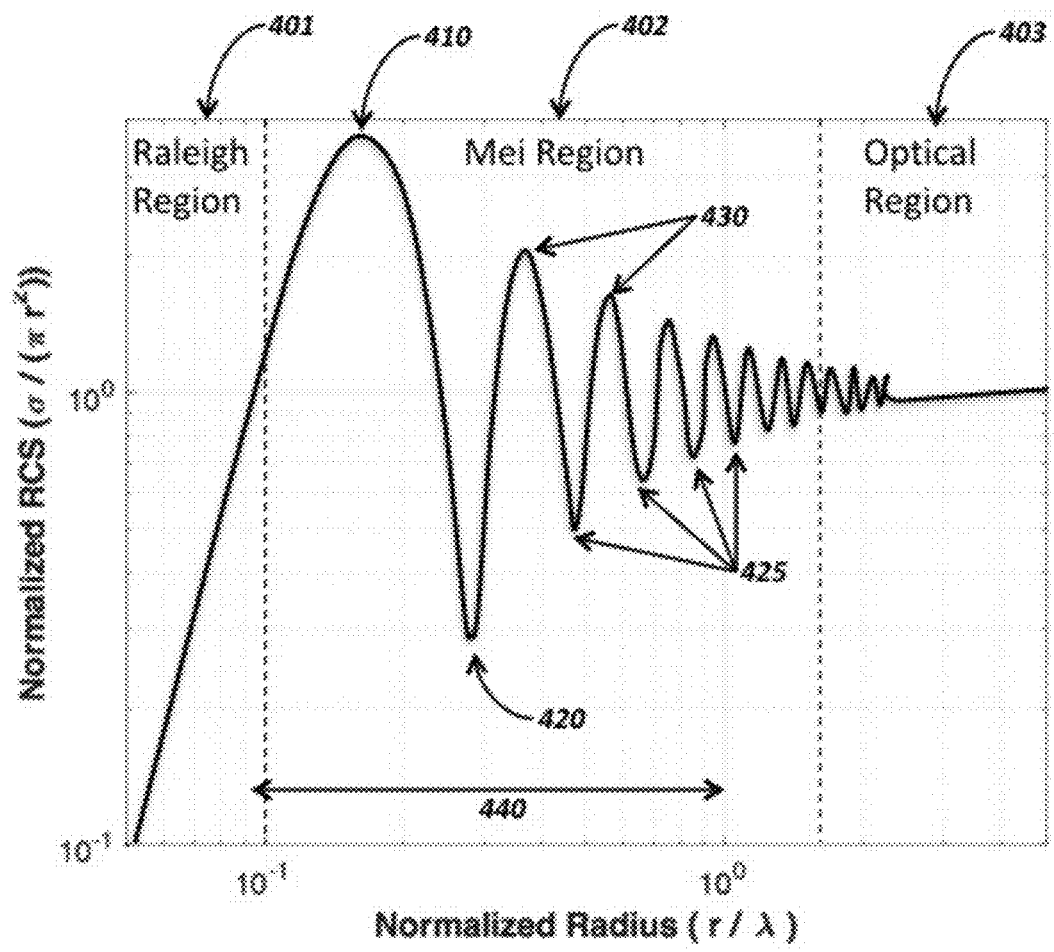
FIG. 4 is a plot of the electromagnetic scattering in the form of normalized Radar Cross Section (RCS) versus the normalized representative radius of a target to be detected and tracked.

FIG. 4 shows a Log-Log plot of the normalized Raleigh (401), Mie (402) and Optical (403) Regimes of electromagnetic normalized scattering RCS vs normalized object size. Additionally it is noted that the peak in RCS at (410) corresponds to a normalized significant object radius of 0.15. If the physical radius of the target is 0.1 meters, then, using FIG. 4, the corresponding wavelength of the peak (410) for such a target is Lam=r/0.15=0.1/0.15=0.666 meters wavelength which corresponds to a frequency of 450 MHz. At 450 MHz, Ground Wave propagation may not be used, but the minimum antenna size, corresponding to a dipole, is Lam/2 at 450 MHz or 0.666 meters/2=0.333 meters. This means that a minimally sized antenna designed to exploit the maximum RCS vs. a target of size radius of 0.1 meters and corresponding to 450 MHz, need be no larger than 0.333 meters located somewhere near the top of the tether (120). The antenna may be built into, and collinear with, the top of the tether (120) just under the UAS (100) or mounted elsewhere onto the UAS (100) in any number of ways. For example, in an embodiment using a vertical dipole, the antenna can provide an elevation beam width of about 90 degrees and 360 degrees coverage in azimuth when built into the tether (120) or mounted on the UAS but off the tether. This may be excessive elevation coverage against low elevation targets such as cruise missiles and so a longer linear array or dipoles along the tether (120) positioned near the drone may be employed to provide higher gain against such targets. Such an antenna may still be small enough to be mounted to the UAS (100) with power from the tether passing through the UAS to feed the antenna.

At 450 MHz, the Ground Wave cannot be used to extend OTH coverage, but the altitude of the antenna provides desired OTH coverage. An elevation beam width of 22 degrees is sufficient to detect cruise missiles at low altitude. Therefore, a lineal array antenna at the top of tether (120), or mounted to the UAS, may be increased to about 1.2 meters length to provide a 22.5 degrees beam width in elevation and a corresponding 6 dB gain boost pointed at the horizon. At 450 MHz, the Doppler Frequency is over 1000 times greater at 75 MHz and the bandwidth may be restricted to about 100 MHz for at least an order of magnitude SNR improvement from narrow band operation vs bandwidths of 1 MHz or more for conventional radars. UAS station keeping with GPS alone may limit some of the coherent integration considered with the previously described LF frequency Ground Wave operation, but Differential GPS permits centimeter positioning accuracy, which enables very long duration coherent integration at an exemplary 0.666 meter wavelength operation. If needed, other means such an ultra wide band or optical precision location technologies may be employed within the base station and/or its support equipment to localize the UAS (100) to less than a centimeter. Therefore, the "Bell Ringer" radar surveillance system may be used to detect low altitude, lower RCS cruise missile type targets that are over the local horizon.

Using FIG. 4, if one chooses detection of a significant target size of 0.1 meters with 450 MHz RF frequency for normalized size of r/Lam=0.15 in order to obtain a maximized RCS at (410), there is a minimum RCS (potentially a null) at r/Lam=0.3, that corresponds to a target size of 0.2 meters at (420), and at multiples of higher frequencies (425). To move the response of this 0.2 normalized radius sized target down to to a desired peak RCS (410), requires use of a different RF wavelength, nominally about twice as large as that used for the 0.1 meter sized target, that is 1.333 meters wavelength, or 225 MHz. Therefore, the use of at least two frequencies, one at about 450 MHz and one at about 225 MHz, and the subsequent combining of their radar responses, ensures that a target of any size between between 0.1 and 0.2 meters size will present a maximally sized RCS at one of the two frequencies or the other. Alternatively, the radar responses from the two frequencies can be combined electronically or analytically in the radar. Combination means include, but are not limited to, the operation of maximum of the two outputs from the two frequencies, average, or Root Mean Square (RMS), as if they were quadrature signals, thereby always ensuring a solid combined frequency return from the target, or a combination of such techniques. This arrangement substantially guarantees that one or the other of these two frequencies will be on or near a crest of a substantial number of the RCS lobes (430) in the Mie Region (402), thereby maximizing the sensor's detection performance. This substantially ensures the normalized RCS is always at or above a value of "1" for over a decade of target size variation (440), essentially making all physically realizable targets of most any size maximally detectable with respect to the RCS. The two aforementioned complementary frequencies are referred to as "Complementary Frequencies" or "Antipodal Frequencies" due to the nature of their combined ability to invert RCS nodes into anti-nodes.

The Complementary Frequencies may be similarly effective by employing a singular center frequency of about (225+450)/2=337.5 MHz with an instantaneous or swept dwell bandwidth of 450-225=225 MHz, or two frequencies at about 393.75 MHz and 281.25 MHz with symmetric bandwidths about them of 112.5 MHz each, or similar combinations thereof to achieve coverage of about the 225-450 MHz band as described above. As can be appreciated by those skilled in the art of radar technology, other frequency pairs may be used due to the periodic nature of Mie scattering as shown in FIG. 4 to achieve substantially similar RCS enhancement results as described above.

To this point, the disclosed embodiments of the invention have centered around a singular, antenna based UAS elevated radar with 360 degree azimuth OTH capability. This antenna may be a simple vertical dipole-like antenna or a simple multi-element vertical linear array to provide more gain on the horizon over 360 degrees of coverage. It may be a multi-frequency or a broad band type antenna to support the Complementary Frequencies of the radar, or two suitable proximate antenna, one for each frequency may be employed.

The antenna(e) may be integrated into the tether or mounted to the drone, or both. If the antenna is integrate into the tether, isolation means may be incorporated into the conductive cable of the tether to prevent the conductive cable carrying power to the drone, from electrically shorting out the proximate antenna. This may be as simple as introducing RF blocking filters into the conductive cable of the tether to allow passage of power to the UAS, while blocking the RF from the radar antenna so as to not short out the antenna.

If a multi-element linear array is provided, it may also be electronically steered in elevation to maximize its gain on the horizon. Such an antenna may be of a single or multi-frequency linear array (since the Complementary Frequencies have octave separation, antennas are often designed to simultaneous support octave separated frequencies), or it may be a wide band or Ultra Wide Band (UWB) Connected Linear Array (CLA) that can support any frequency within the design band. Since modern transceivers are invariably software based, providing extreme flexibility in dynamic frequency and waveform selection, a wide band or UWB antenna is very attractive for providing the radar with significant frequency diversity both to avoid commercial frequency bands and also to avoid potential enemy jammer signals.

Figure 5:
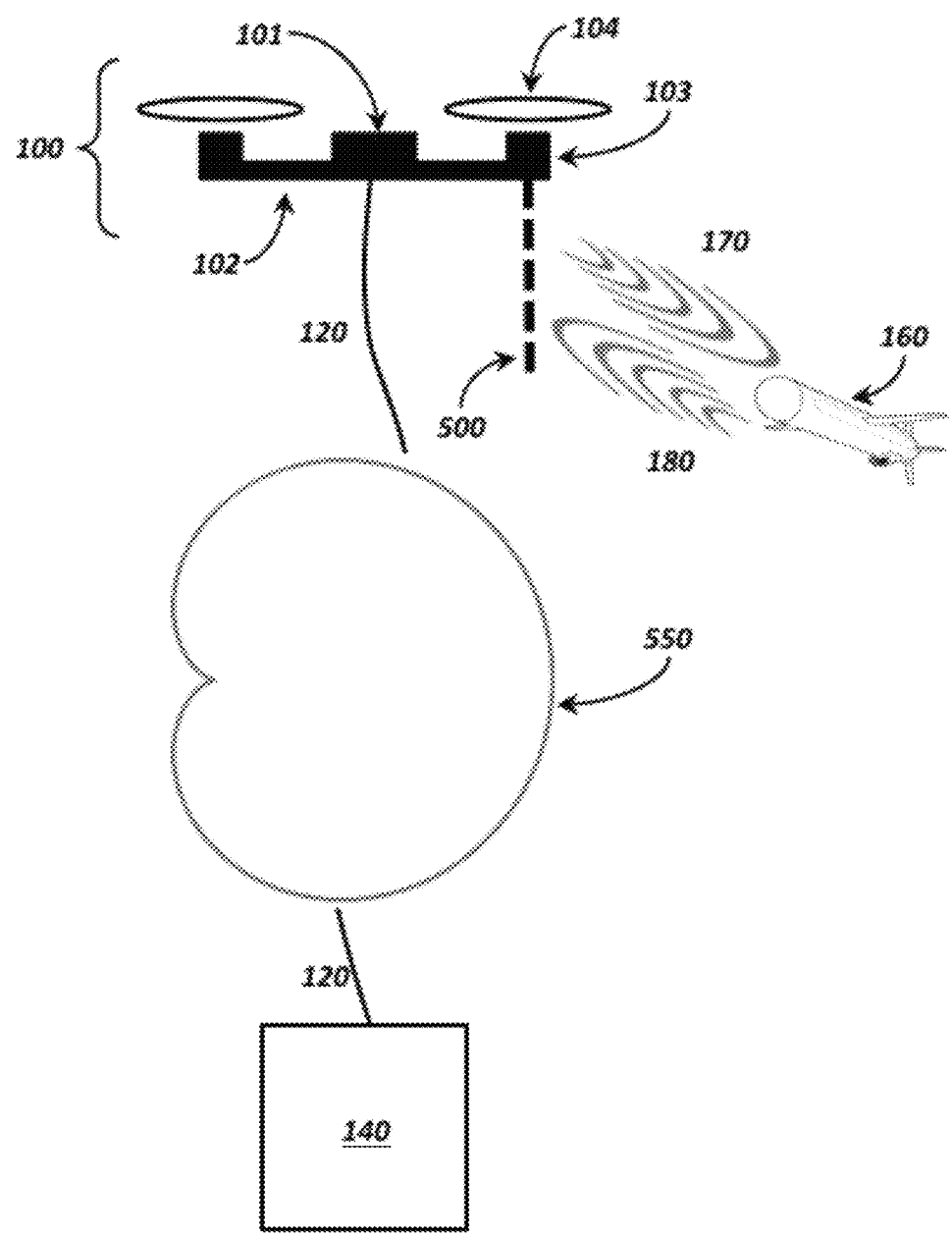
FIG. 5 is an illustration of an embodiment of the invention with a singular vertically oriented linear antenna and its associated gain pattern.

Although desire for 360 degree azimuthal surveillance coverage is fairly ubiquitous, tactical requirements often give preference to "Primary Target Lines" (PTLs) indicating the expected approach corridor for targets of interest. For example, for surveying targets ingressing on or near a PTL, (FIG. 5), a linear antenna (500) may be mounted on the UAS (100), affixed, for example, to one of its rotor struts (102) or under one of its motors/gearboxes (103), or on a separate strut between two adjacent motors/gearboxes (103), and placed so as to use the conducive cable within the tether (120) as a sparse backplane for the linear array. This provides a Cartioid-like shaped antenna gain pattern in azimuth (550, top view), with a null in the direction from the linear antenna (500) to the tether (120), and an enhanced gain lobe in the direction from the tether (120) to the linear antenna (500). UAS station keeping maintains orientation of the gain lobe in the desired PTL azimuth, and maintenance of this orientation might be assisted by a "Yaw" propeller and motor (not shown) added to the UAS, not unlike the tail rotor of a traditional helicopter maintains the helicopter's azimuthal yaw orientation.

Figure 6A:
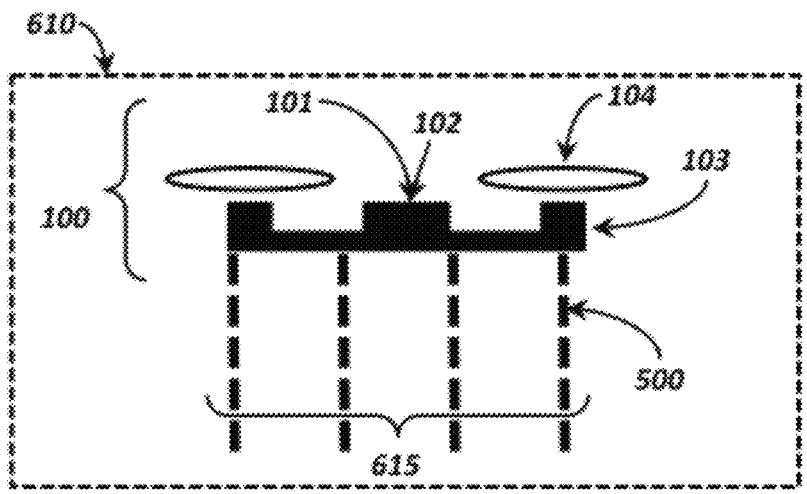
FIGS. 6A-C illustrate an embodiment comprising an array of multiple laterally or otherwise distributed vertical antennas, an embodiment comprising an array of horizontal antennas, and a gain pattern as viewed from behind the arrays looking toward a target, respectively.

As can be appreciated by one skilled in the art of antenna design, the antenna configurations described hereto are but few of a myriad of light weight antennas and arrays which may be easily hosted by the UAS. FIG. 6A shows a vertically oriented array embodiment (610) comprising a vertically oriented array grouping (615) of linear arrays (500) suspended from the bottom of different UAS structural components located at different lateral positions on the UAS, including the body (101), the struts (102) and motors gearboxes (103). The linear arrays (500) are electrically fed to provide a vertically oriented array grouping (615) with high azimuthal gain and/or low side lobes. This may be preferred to increase gain on the target and also to lower the side lobe gain to clutter, interference, and potential jamming. Such an array grouping, regardless of its physical arrangement (i.e. regardless of where laterally on the UAS the linear arrays are physically located), can be electrically fed to provide flexible beam forming as well as electrical steering in both azimuth and elevation as might be required to meet specific mission and system requirements for the sensor.

Figure 6B:
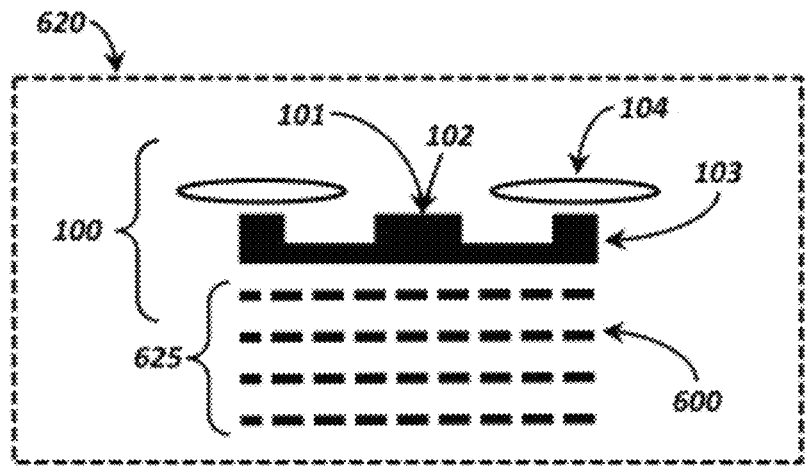

The antennas may be built into the UAS structure proper or otherwise suspended therefrom. For example, if horizontal polarization is preferred, the linear array(s) (500) may be oriented horizontally and mounted into or along, or suspended from one or more of the struts (102) of the UAS (100) or between them. For example, a horizontally oriented array embodiment (620) may comprise a horizontally oriented grouping (625) of horizontally disposed linear arrays (600) suspended under the UAS (100) (FIG. 6B). With suitable feeding, such an array may possess high gain and be steerable in both elevation and azimuth. In an alternative embodiment, a passive reflective backplane is suspended from the UAS but backset at a quarter wavelength from the active array grouping (625) to provide a backplane.

An embodiment comprising a curtain-like array grouping comprising both horizontally and vertically oriented linear arrays may provide both azimuth and elevation steering. All of the antennas described herein may be attached to motor driven gears and/or actuators that reversibly retract the arrays into stowed positions to protect the arrays during UAS recovery, storage, and launch. The antenna arrays need not be located under the UAS, as shown, but the position under the UAS is advantageous in terms of maintaining a center of balance for the and helps the UAS creep into the wind due to drag on the antennae. The antenna and/or antenna elements of an array may comprise other types of well known VHF/UHF antennas, including Yagi and other related directional antennas.

Figure 7:
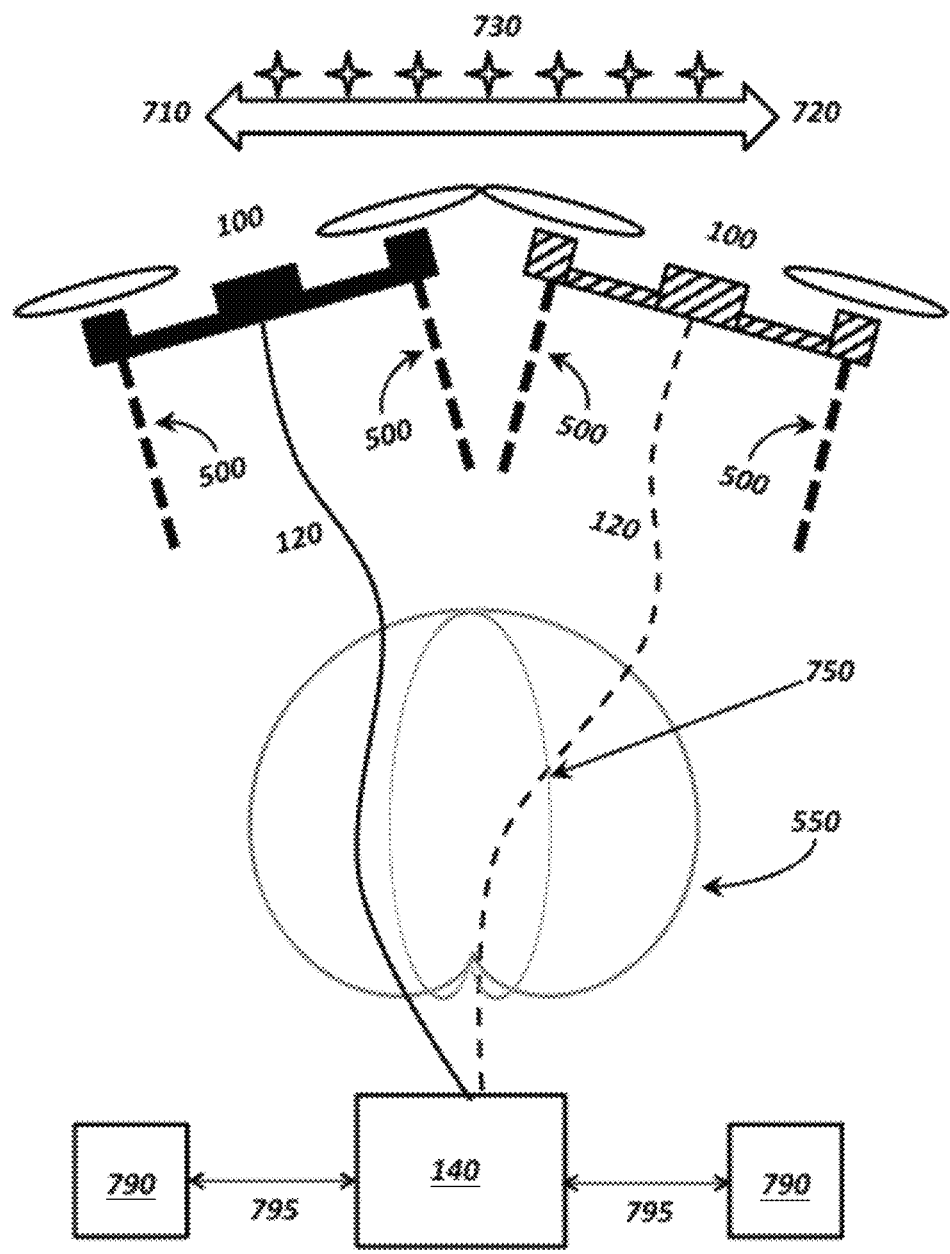
FIG. 7 is an illustration of an embodiment of the invention involving a lateral or conical motion of a drone to traverse a synthetic aperture of phase centers to apply synthetic aperture radar algorithms.

In addition to stationing in a fixed location, embodiments of the invention may take advantage of their mobility to improve performance and/or provide additional technical advantages such as precision locating capability. FIG. 7 shows a UAS comprising a plurality of linear arrays (500), viewed from behind, looking towards the PTL with a physical beam pattern (550). The UAS array system comprises an inertial navigation system (INS), a GPS, optionally augmented with ground based differential GPS, precision UWB and/or optical positioning systems (790). Sharing position data with the signal processor (795) in the base station allows movement of the antenna simply by flying the UAS, for example in opposite directions (710, 720) perpendicular to the PTL, or in a conic circe on the tether. This provides a plurality of physical locations known as phase centers (730) from which coherent RF dwells are emitted and received from the UAS antennas. Knowing the precise positions and times of these phase centers, a synthetic aperture may be formed that is much larger than the physical aperture, and using Synthetic Aperture Radar (SAR) type of algorithms, a much narrower angular precision synthetic beam (750) may be formed and steered. This allows more accurate angle tracking of OTH low altitude targets without notably higher cost or hardware complexity. SAR algorithms are already known and practiced in the field.

Figure 6C:
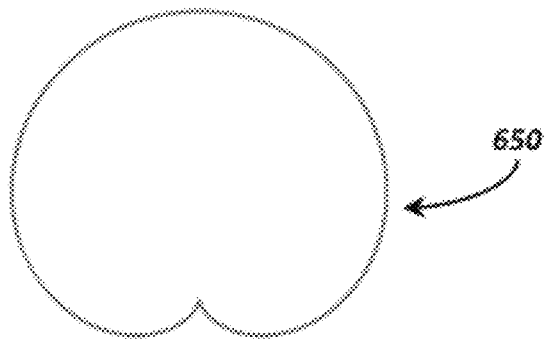
Figure 8:
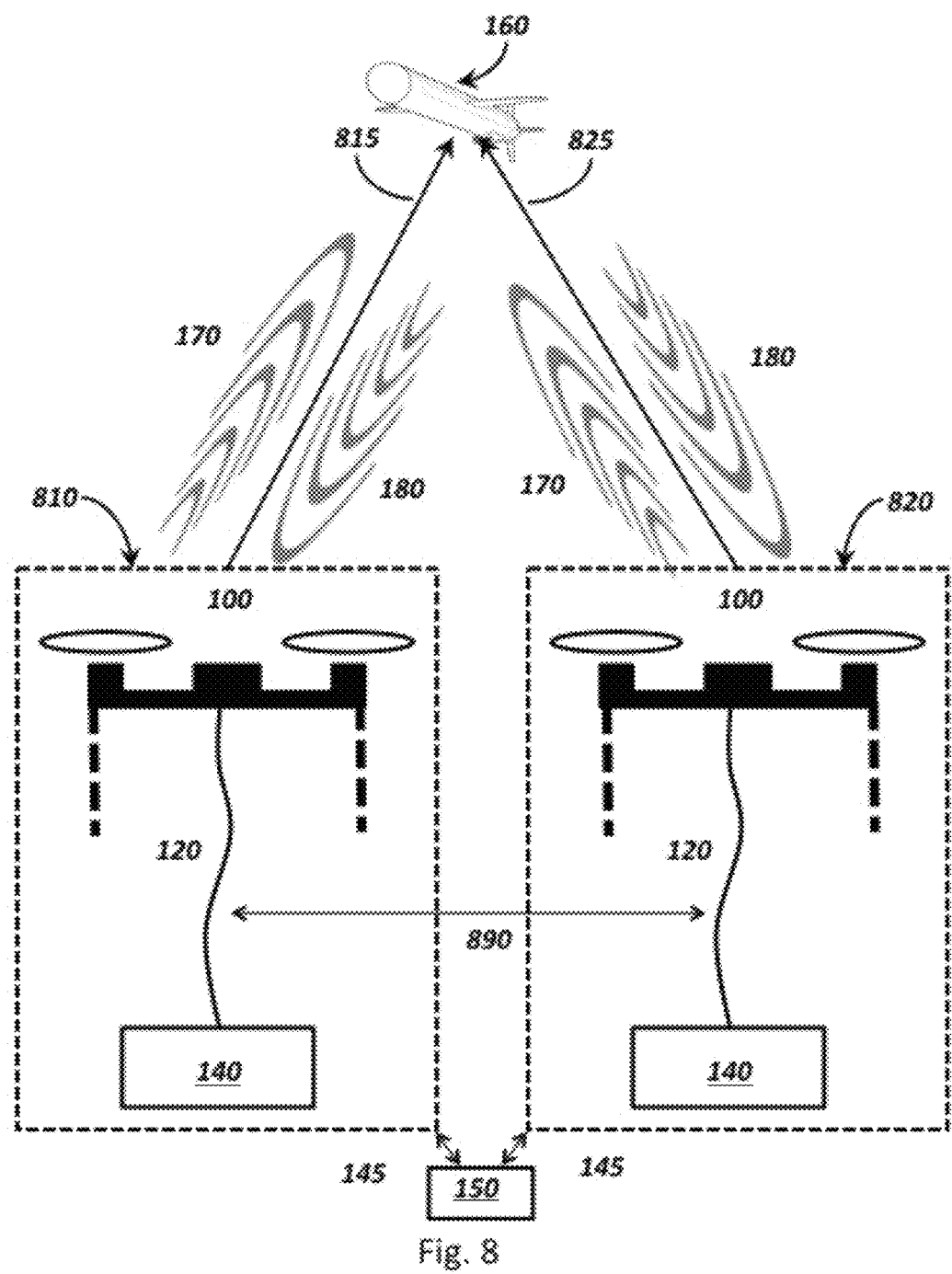
FIG. 8 is an illustration of an embodiment of the invention comprising multiple drone based radars allowing trilateration of multiple target ranges and determination of target bearing.

FIG. 8 shows an embodiment of a system comprising first and second UAS based sensor systems (810, 820), separated by a distance (890) sufficient to provide geometric dilution of precision to achieve desired resolution requirements, in order to conduct multilateration on the target(s). Multilateration uses a measurement of the difference in distance to two stations at known locations by broadcast signals at known times. Radar range measurements (815) and (825) are transmitted over networks (145) to a MCC2 (150) for fusion. This provides higher reliability through redundancy, provides additional propagation paths and channels to defeat propagation drop outs, provides redundant sensor target confirmation, mitigates jamming attempts, and makes a multi-sensor system of systems much harder for an enemy to attack and defeat. The deployment of multiple systems and their integration as per FIG. 7 may be integrated with SAR techniques (FIG. 6) to provide even higher and more robust sensor performance.

Figure 9:
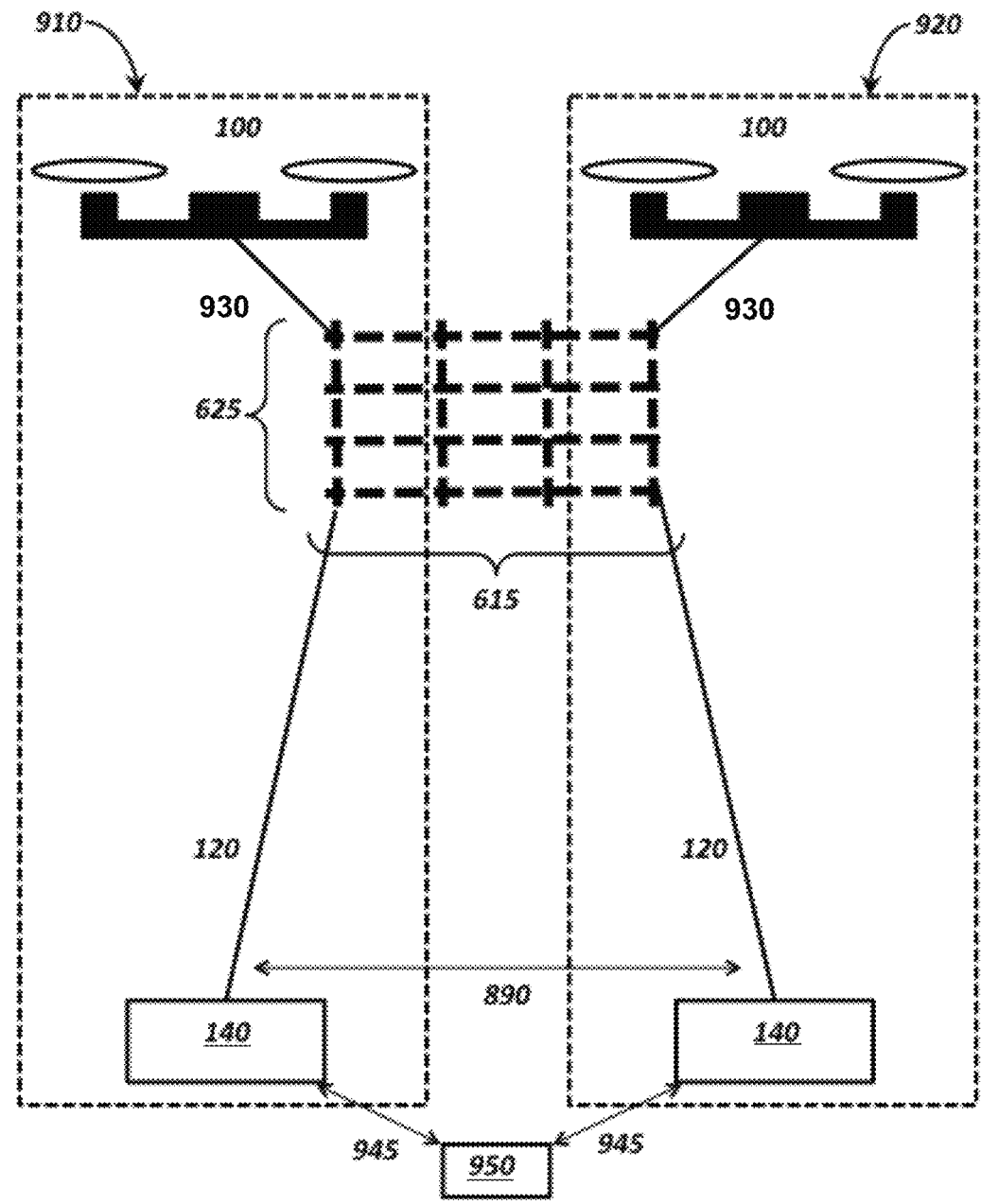
FIG. 9 is an illustration of an embodiment of the invention comprising multiple drones to collectively suspend and control the position of a porous (to air) radar array.

FIG. 9 is a schematic of an embodiment of a system comprising two or more UASs including a first UAS based sensor subsystem (910) and a second UAS based sensor subsystem (920) that cooperate to suspend a large array comprising vertically oriented linear arrays (615) and/or horizontally oriented linear arrays (625), to provide a single or dual polarized two dimensional (2D) array held suspended between the two UASs (100). Thin singular array elements are preferred in order to minimize air drag in winds aloft, but any suitable low weight array could be employed. A tether (120) extends from each base station (140) for each UAS to the bottom of the 2D array, and passes through the lateral ends of the array (615, 625) to connect to the UASs (100) via tether extensions (930). The tether (120) may split off power, RF and/or controls to the array before continuing to each UAS via extensions (930), or tether (120) may connect to the UAS and then be routed back down again to the array after suitable control and conditioning in the UAS via tether extension (930). The base stations (140) are separated by a distance apart (890) sufficient to provide appropriate stability and tensioning of the system.

The UASs (100) may likewise be precision positioned with INS, GPS, and precision positioning devices (790) with data links to a signal processor (795) to precisely position the UASs and the antenna array. In various alternative embodiments, the base stations (140) may be singularly one unit, or the transceiver may be one unit of various combinations thereof. If independent transceivers are used, for example for vertical and horizontal polarizations, their data is combined in a central signal and data processor (950) with data lines (945) to fuse them and provide an integrated sensor output.

Systems according to the invention are not limited to two UASs or drones (100). Embodiments comprising multiple UASs/drones (100) flying multiple individual radars or multiple radar arrays may be used to provide 360 degree coverage from multiple arrays. Embodiments of the invention may comprise a multiplicity of individual radars, one per UAS, arranged to create a large linear, circular, e.g.

Wullenweber or Pusher type array, or 3D antenna arrays, with array elements comprising the UAS radars, all mutually fed with a coherent signal from a central transceiver connected to all the UAS/drone radars, to a multiplicity of individual or paired UASs/drones carrying 2D arrays pointed in different PTL directions and fuzed in the MCC2 (150).

Figure 10:
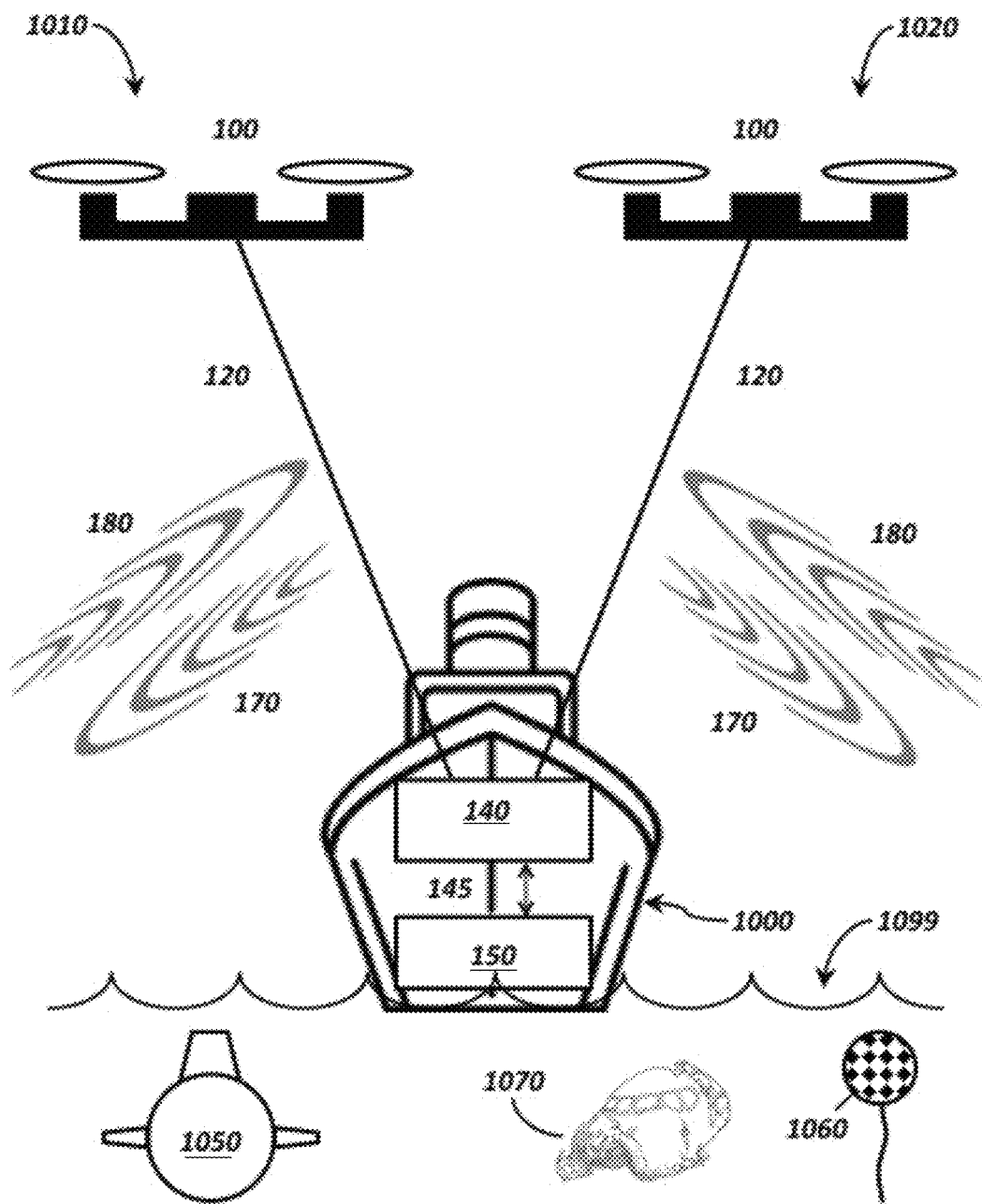
FIG. 10 is an illustration of a an embodiment of the invention comprising multiple drones to perform Low Frequency or Very Low Frequency subsurface radar motion detection and SAR imaging for submarines, mines, and submerged vessels and objects.

Returning to the operation of embodiments using very low frequencies circa 30 MHz and below, FIG. 10 illustrates the operation of an embodiment of the invention for surveillance under water instead of over the horizon. Using frequencies less than 30 MHz to penetrate ocean water, first and second UAS based sensor systems (1010 and 1020) are tethered to a vessel (1000) floating on the water (1099). The first and second UAS based systems (1010 and 1020) each comprise long wavelength length antennas either integral to UAS tethers (120) or otherwise deployed according to one of the embodiments previously disclosed, and associated radars, to search for and track submarines (1050), find mines (1060), find wreckage (1070), and/or map the sea floor to either side of the vessel (1000). A number of additional UAS based sensor systems may be employed along the length of the ship and combined to provide a real aperture with real aperture beam forming. An embodiment as shown in FIG. 10 may additionally be used for communicating with friendly submarines because the long wavelengths make reverse location of the surveying ship difficult.

Several examples have been used to describe the invention but the invention is not intended to be limited to the examples provided. It is to be understood that the invention applies to any sensor which may be feasibly integrated and hosted by a long endurance drone using the employment and teachings herein.

The invention claimed is:

1. An early warning radar system for over the horizon line of sight (OTH LOS) radar sensing, said early warning radar system comprising:
   a first unmanned aerial system (UAS) comprising a processor controller, and an electric motor powering a rotor;
   a radar antenna;
   a radar transceiver;
   a radar signal processor;
   a base station; and
   a first tether connecting the first UAS to the base station wherein:
   the first tether comprises high tensile strength cable and a power cable that provides power from a power source to the first UAS;
   the base station comprises a first tether control mechanism comprising a tether reel and spool;
   the base station comprises a mission and command control system;
   the processor controller communicates with the mission and command control system and tether control system to keep the first tether at a desired tension, to keep the first tether at a desired length, to keep the first UAS at a desired altitude, or any combination of these; and
   the early warning radar system is configured for tracking and classifying one or more encroaching objects.

2. The early warning radar system of claim 1, wherein the first UAS comprises a body enclosing a power conversion circuit for converting a first voltage of electrical power from the power cable to a second voltage to power the electric motor.

3. The early warning radar system of claim 1, wherein the first tether comprises a conductive cable that serves as the radar antenna and receives reflected radar signals and conducts the reflected signals to the base station.

4. The early warning radar system of claim 1, wherein the radar antenna is suspended from the first UAS.

5. The early warning radar system of claim 4, wherein the radar antenna suspended from the first UAS is a linear antenna and the tether comprises a conductive cable functions as a sparse backplane.

6. The early warning radar system of claim 1, wherein the first tether comprises a conductive cable or fiberoptic cable that transmits data between the base station and the processor controller.

7. The early warning radar system of claim 1, wherein the first UAS comprises a GPS, an internal inertial measurement unit (IMU), or both, that transmits data to the base station.

8. The early warning radar system of claim 1, further comprising a second UAS and wherein the antenna comprises a group of linear antenna arrays suspended from the first and second UAS.

9. The early warning radar system of claim 8, wherein the group of linear arrays are horizontally oriented, vertically oriented, or both.

10. The early warning radar system of claim 1, wherein:
    the antenna comprises a plurality of linear antenna arrays suspended from the first UAS;
    timed position data of the first UAS is shared with a signal processor in the base station; and
    movement of the first UAS causes a synthetic aperture to be formed.

11. The early warning radar system of claim 1, further comprising a second UAS and a second tether connecting the second UAS to the base station, wherein:
    the second tether comprises a high tensile strength cable and a power cable that provides power from a power source to the second UAS;
    the base station comprises a second tether control mechanism comprising a tether reel and spool;
    the processor controller communicates with the mission and command control system and tether control system to keep the second tether at a desired tension, to keep the second tether at a desired length, to keep the second UAS at a desired altitude, or any combination of these
    in use, the first UAS and second UAS are separated by a distance sufficient to conduct multilateration on a target.

12. The early warning radar system of claim 1, wherein:
    the radar transceiver is electronically connected to the conductive cable, which acts as a monopole antenna to transmit an RF waveform and
    a separate receiving conducting cable is configured to receive reflected RF waveforms and transmit received reflected RF waveforms to the base station.

13. The early warning radar system of claim 1, wherein said radar system is a pulsed Doppler based radar transceiver.

14. The early warning radar system of claim 1, wherein herein the radar signal processor is located in the base station.

15. The early warning radar system of claim 1, wherein said UAS further comprises a Forward Looking Infrared (FLIR) sensor and/or an Infrared Search and Track (IRST) sensor built into, mounted to, or suspended from the UAS.

16. The early warning radar system of claim 1, wherein the antenna acts as a ground plane monopole antenna and the base station provides a ground plane.

17. The early warning radar system of claim 1, the first tether comprises a conductive cable that serves as the radar antenna and said radar antenna is between 1,000 and 2,500 meters long.

18. The early warning radar system of claim 1, wherein the antenna is no larger than 0.333 meters and the antenna is either built into the top of the tether or mounted onto the UAS.

19. A system for underwater radar detection, said system comprising:
- a first unmanned aerial system (UAS) comprising a processor controller and an electric motor powering a rotor;
- a first tether connecting the first UAS to a floating base station;
- a second UAS comprising a processor controller and an electric motor powering a rotor;
- a second tether connecting the second UAS to the floating base station wherein:
- the first and second tethers each comprises high tensile strength cable and a power cable that provides power from a power source to the first UAS and second UAS;
- the first and second tethers each comprise a conductive cable that acts as an antenna for a radio frequency (RF) signal having a frequency of less than 30 MHz;
- the floating base station comprises a tether control mechanism comprising a tether reel and spool;
- the base station comprises a radar transceiver and a radar signal processor functionally coupled to the conductive cables of the first and second tethers,
- the first and second UAS each comprise a processor controller that communicates with a mission and command control system and tether control system on the base station to keep the first tether at a desired tension, to keep the second tether at desired tension, to keep the first tether at a desired length, to keep the second tether at a desired length, to keep the first UAS at a desired altitude, to keep the second UAS at a desired altitude, or any combination of these; and
- said system is configured for detecting and tracking submarines, mines, and/or wreckage.

* * * * *